US012194498B2

(12) United States Patent
Taki et al.

(10) Patent No.: US 12,194,498 B2
(45) Date of Patent: Jan. 14, 2025

(54) ULTRASONIC TRANSDUCER HAVING DAMPER PORTION PROVIDED IN WIRING MEMBER

(71) Applicant: TDK CORPORATION, Tokyo (JP)

(72) Inventors: Tatsuya Taki, Tokyo (JP); Koki Toyoshima, Tokyo (JP); Toshiki Maruyama, Tokyo (JP)

(73) Assignee: TDK CORPORATION, Tokyo (JP)

( * ) Notice: Subject to any disclaimer, the term of this patent is extended or adjusted under 35 U.S.C. 154(b) by 733 days.

(21) Appl. No.: 17/490,929

(22) Filed: Sep. 30, 2021

(65) Prior Publication Data

US 2022/0105542 A1 Apr. 7, 2022

(30) Foreign Application Priority Data

Oct. 1, 2020 (JP) ................................ 2020-166938

(51) Int. Cl.
*B06B 1/06* (2006.01)
*G10K 9/125* (2006.01)

(52) U.S. Cl.
CPC ........... *B06B 1/0655* (2013.01); *G10K 9/125* (2013.01); *B06B 1/0681* (2013.01)

(58) Field of Classification Search
CPC .... B06B 1/0655; B06B 1/0681; G10K 9/125; G10K 9/122; G10K 11/002
See application file for complete search history.

(56) References Cited

U.S. PATENT DOCUMENTS 9,003,887 B2 * 4/2015 Matsumoto ............. G10K 9/22
73/632

FOREIGN PATENT DOCUMENTS

| | | | |
|---|---|---|---|
| CN | 103843366 | A | 6/2014 |
| JP | 2007-318742 | A | 12/2007 |
| JP | 4182156 | B2 | 11/2008 |

* cited by examiner

*Primary Examiner* — Emily P Pham
(74) *Attorney, Agent, or Firm* — Oliff PLC

(57) ABSTRACT

The ultrasonic transducer includes a case, a piezoelectric vibrator disposed in the case, a wiring member overlapped with the piezoelectric vibrator in the case and inputting signals for vibrating the piezoelectric vibrator received from the outside to the piezoelectric vibrator, and a damper portion provided in the wiring member and adjacent to the piezoelectric vibrator when viewed from the thickness direction of the piezoelectric vibrator.

10 Claims, 8 Drawing Sheets

ULTRASONIC TRANSDUCER HAVING DAMPER PORTION PROVIDED IN WIRING MEMBER

CROSS-REFERENCE TO RELATED APPLICATIONS

This application is based upon and claims the benefit of priority from Japanese Patent Application No. 2020-166938, filed on 1 Oct. 2020, the entire contents of which are incorporated herein by reference.

TECHNICAL FIELD

The present disclosure relates to an ultrasonic transducer.

BACKGROUND

Conventionally, an ultrasonic transducer in which a piezoelectric vibrator is disposed in a case is known. For example, Japanese Patent No. 4182156 discloses an ultrasonic transducer having a plate-shaped piezoelectric vibrator with electrodes formed on both main surfaces thereof, and a wire for inputting signals to the electrodes of the piezoelectric vibrator.

SUMMARY

In an ultrasonic transducer, further reduction of reverberation of an ultrasonic component is required. However, in the above-described conventional ultrasonic transducer, reverberation of the ultrasonic component is not sufficiently reduced.

An advantage of some aspects of the present disclosure is to provide an ultrasonic transducer in which reverberation of an ultrasonic component is reduced.

According to an embodiment of the present disclosure, there is provided an ultrasonic transducer including a case, a piezoelectric vibrator with a plate shape disposed in the case, a wiring member which is overlapped with the piezoelectric vibrator in the case and inputs a signal for vibrating the piezoelectric vibrator received from the outside to the piezoelectric vibrator, and a damper portion which is provided in the wiring member and is adjacent to the piezoelectric vibrator when viewed from a thickness direction of the piezoelectric vibrator.

In the ultrasonic transducer above, the damper portion provided adjacent to the piezoelectric vibrator prevents vibration transmitted through the wiring member due to vibration of the piezoelectric vibrator. Therefore, the ultrasonic transducer can reduce reverberation of the ultrasonic component.

An ultrasonic transducer according to another aspect includes an external wiring that inputs a signal for vibrating a piezoelectric vibrator to a wiring member.

In the ultrasonic transducer according to another aspect, the external wiring extends in a direction along the thickness direction of the piezoelectric vibrator.

In the ultrasonic transducer according to another aspect, the wiring member has a contact portion that is in contact with the external wiring outside the damper portion when viewed from the thickness direction of the piezoelectric vibrator.

In the ultrasonic transducer according to another aspect, the damper portion is positioned between the contact portion and the piezoelectric vibrator when viewed from the thickness direction of the piezoelectric vibrator.

In the ultrasonic transducer according to another aspect, the damper portion extends across between the contact portion and the piezoelectric vibrator when viewed from the thickness direction of the piezoelectric vibrator.

In the ultrasonic transducer according to another aspect, the damper portion is thinner than the contact portion of the wiring member.

In the ultrasonic transducer according to another aspect, the area of the formation region of the damper portion in the wiring member is larger than the contact area between the wiring member and the external wiring and is larger than the contact area between the wiring member and the piezoelectric vibrator.

In the ultrasonic transducer according to another aspect, the damper portion is bent in the thickness direction of the piezoelectric vibrator.

In the ultrasonic transducer according to another aspect, an opening is provided in the wiring member, and an edge portion of the opening is in contact with the piezoelectric vibrator.

DETAILED DESCRIPTION

Figure 1:
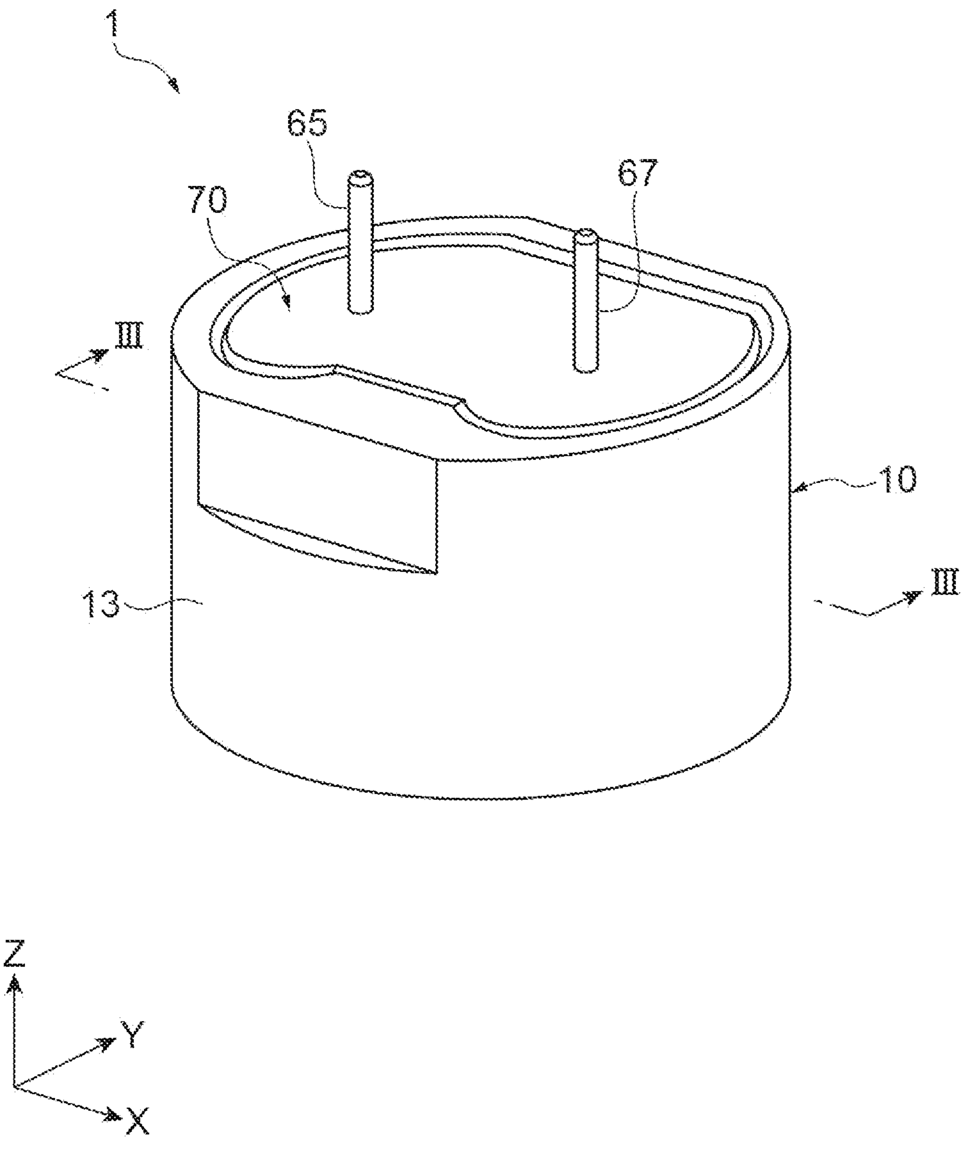
FIG. 1 is a perspective view of an ultrasonic transducer according to an embodiment.

Hereinafter, embodiments of the present disclosure will be described in detail with reference to the accompanying drawings. In the following description, the same element or the element having the same function is denoted by the same reference numeral, and redundant description is omitted.

Figure 2:
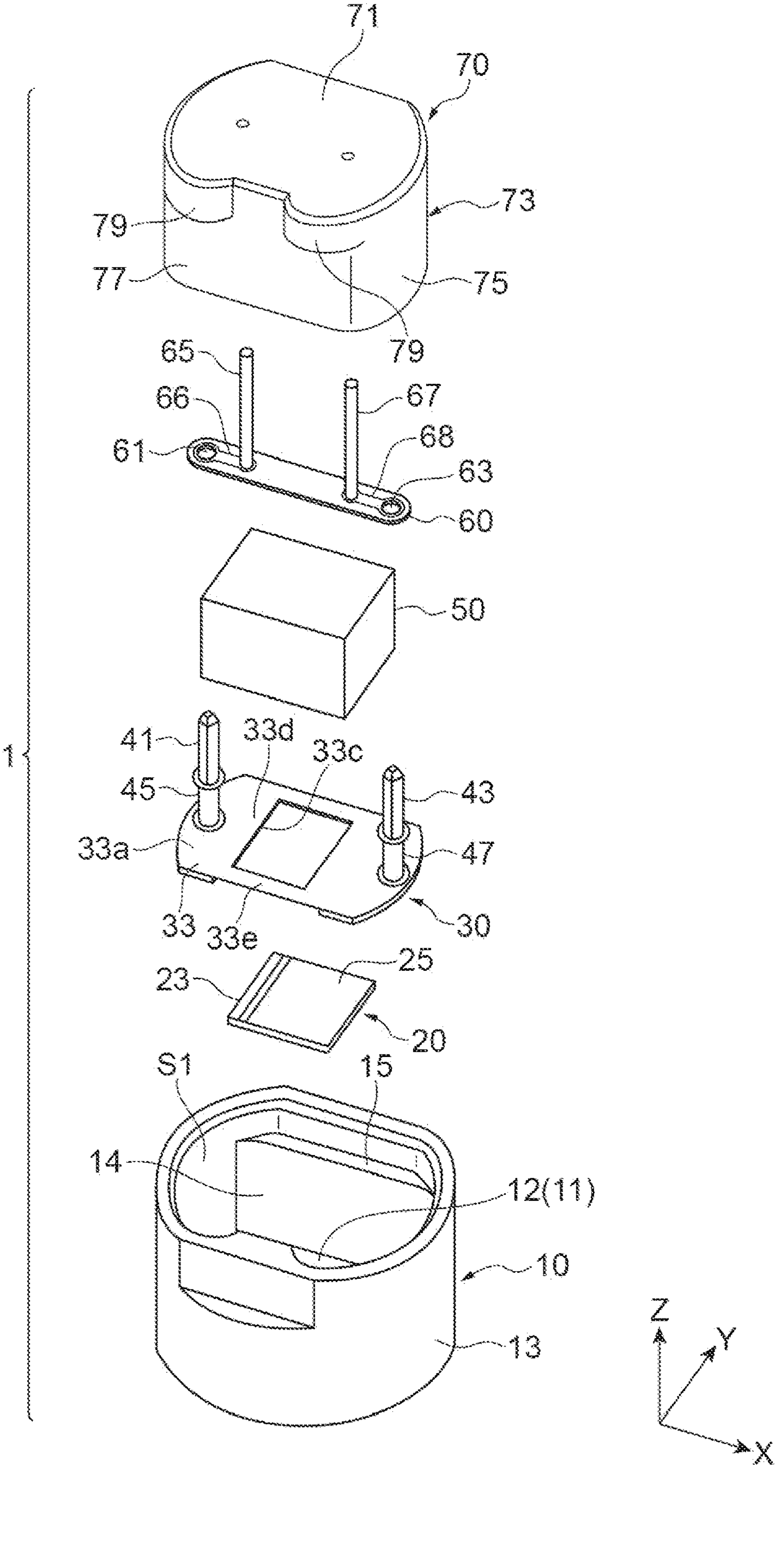
FIG. 2 is an exploded perspective view of the ultrasonic transducer of FIG. 1.
Figure 3:
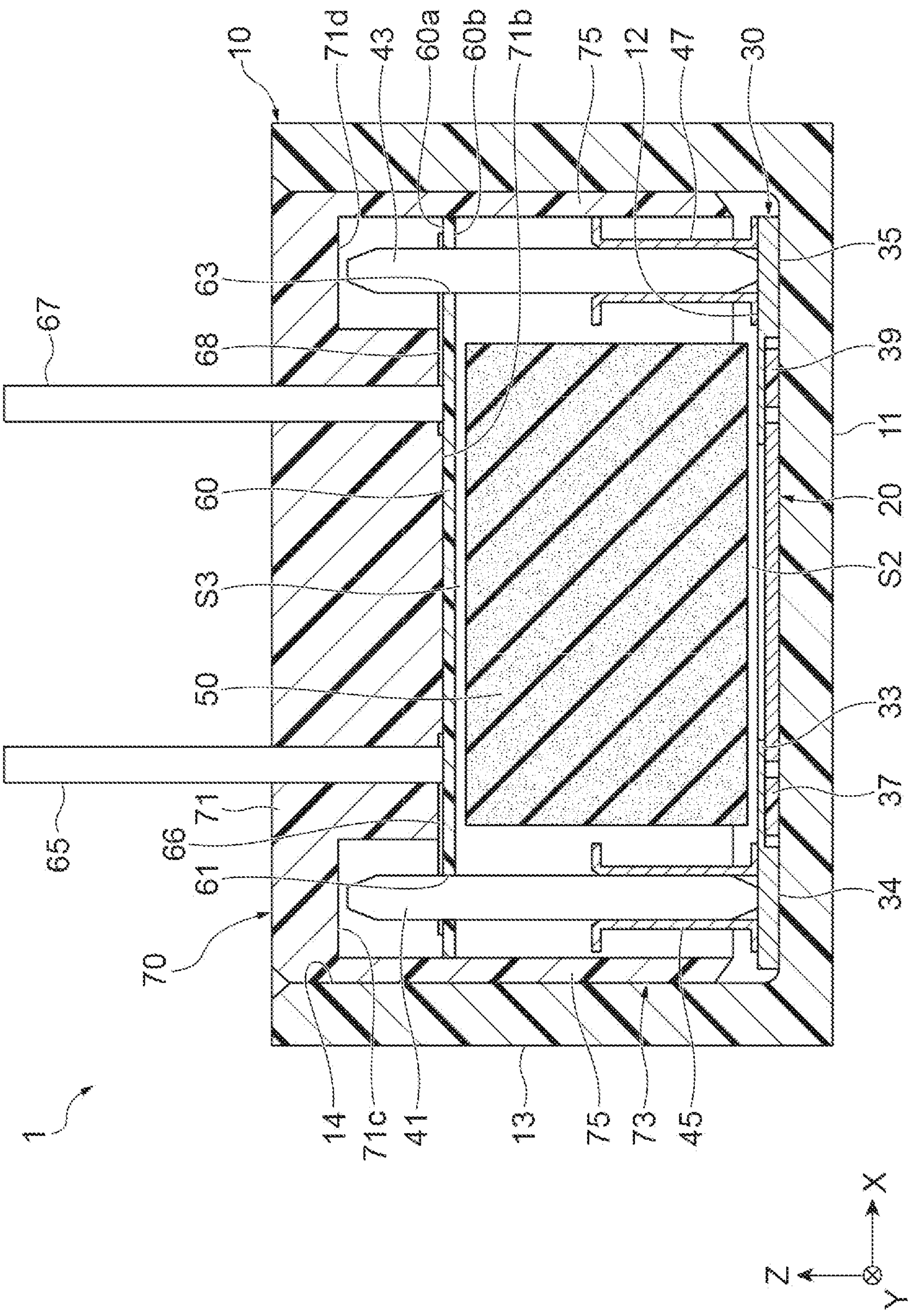
FIG. 3 is a cross-sectional view along line III-III of FIG. 1.

The structure of the ultrasonic transducer 1 according to the present embodiment will be described with reference to FIGS. 1 to 3.

The ultrasonic transducer 1 is configured to be capable of transmitting and receiving ultrasonic waves. The ultrasonic transducers 1 includes a case 10 defining a housing space S1, a piezoelectric vibrator 20 housed in the housing space S1 of the case 10, a wiring member 30, a pair of first pins 41 and 43, a plurality of sleeves 46 and 47, a sound absorbing material 50 and a substrate 60, a pair of second pins 65 and 67, and a vibration isolator 70.

The case 10 is a bottomed cylindrical member having an opening at one end, and includes a bottom wall 11 and a side wall 13 that define the housing space S1. The side wall 13 extends in a direction intersecting the bottom wall 11, and the side wall 13 may extend in a direction orthogonal to the bottom wall 11. In the present embodiment, the bottom wall 11 and the side wall 13 are integrally formed and made of the same material. The case 10 is made of, for example, aluminum (Al). The case 10 may be made of a metal other than Al. The case 10 may be made of, for example, an aluminum alloy, stainless steel, or a copper alloy. The aluminum alloy includes duralumin, for example. The copper alloy includes brass, for example.

The bottom wall 11 of the case 10 has a bottom surface 12 facing the housing space S1 side. The bottom surface 12 has a circular shape having a long diameter and a short diameter when viewed from a direction intersecting the bottom surface 12. In the present embodiment, the bottom surface 12 has an elliptical shape. In the bottom surface 12, the direction along the long diameter and the direction along the short diameter intersect each other. For example, the direction along the long diameter and the direction along the short diameter are orthogonal to each other. The thickness of the bottom wall 11 is, for example, not less than 0.7 mm and not more than 1.5 mm. In the present embodiment, the thickness of the bottom wall 11 is 0.9 mm.

Hereinafter, a direction along the long diameter of the bottom surface 12 is defined as an X direction, a direction along the short diameter of the bottom surface 12 is defined as a Y direction, and a direction orthogonal to the bottom surface 12 is defined as a Z direction.

The bottom surface 12 is defined by a pair of edges 12*a* with a linear shape and a pair of edges 12*b* with an arc shape. The pair of edges 12*a* extend in the X direction and are separated from each other in the Y direction. The pair of edges 12*a* are substantially parallel to each other. The edges 12*b* connect ends of the edges 12*a*. The circular shape having the long diameter and the short diameter may be an oval shape. The direction intersecting bottom surface 12 may be, for example, a direction orthogonal to bottom surface 12. The direction intersecting the bottom surface 12 may coincide with the direction intersecting the bottom wall 11.

The side wall 13 has an inner side surface 14. The bottom surface 12 and the inner side surface 14 constitute an inner surface of the case 10. A plurality of stepped portions 15 are formed on the inner side surface 14. In the present embodiment, three step portions 15 are formed. One of the step portions 15 extends along one edge 12*a*. The other two of the step portions 15 are provided apart from each other along the other edge 12*a*. The step portions 15 are used for positioning the vibration isolator 70 with respect to the case 10.

Figure 4:
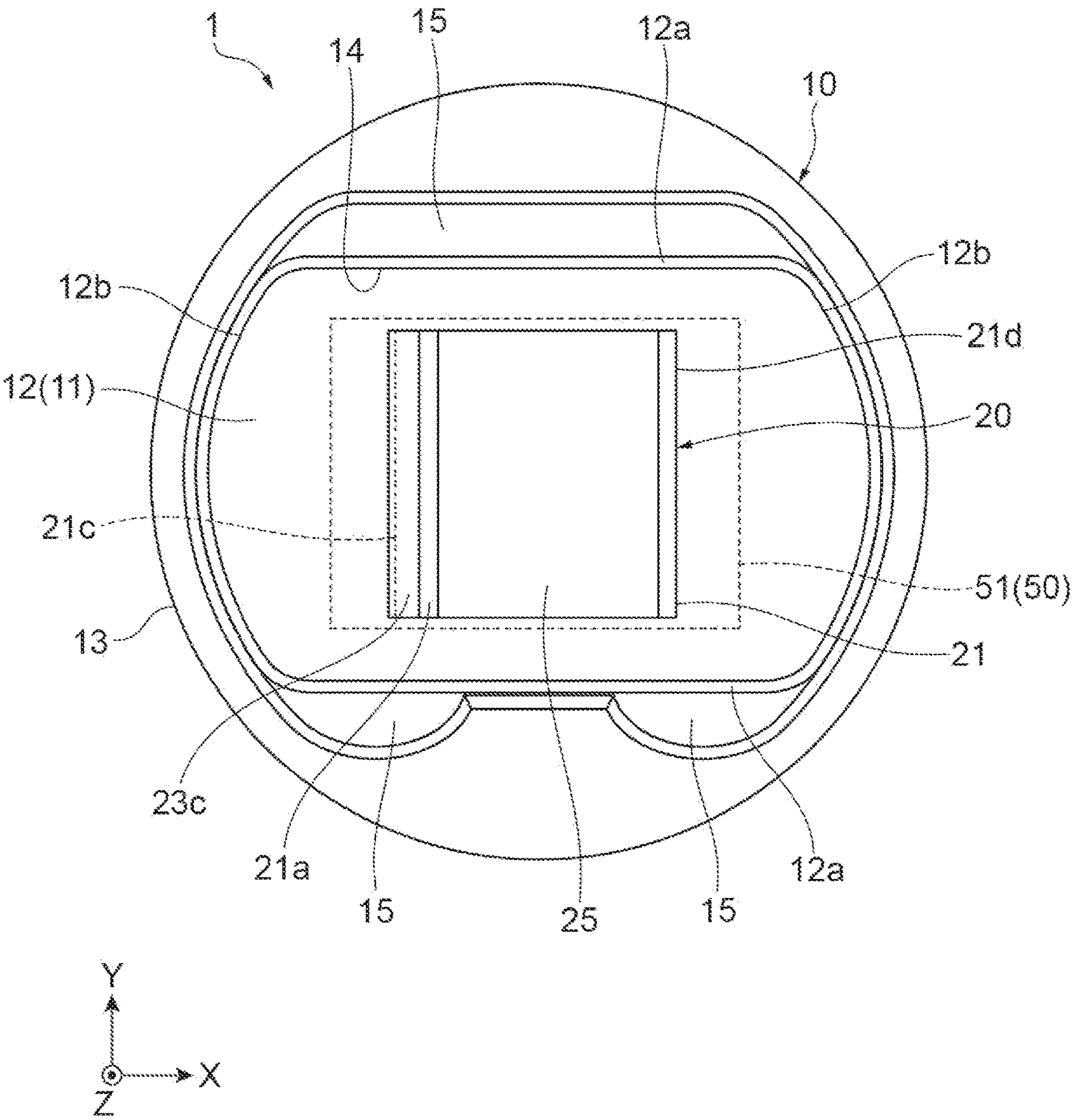
FIG. 4 is a plan view of the case and the piezoelectric vibrator.
Figure 5:
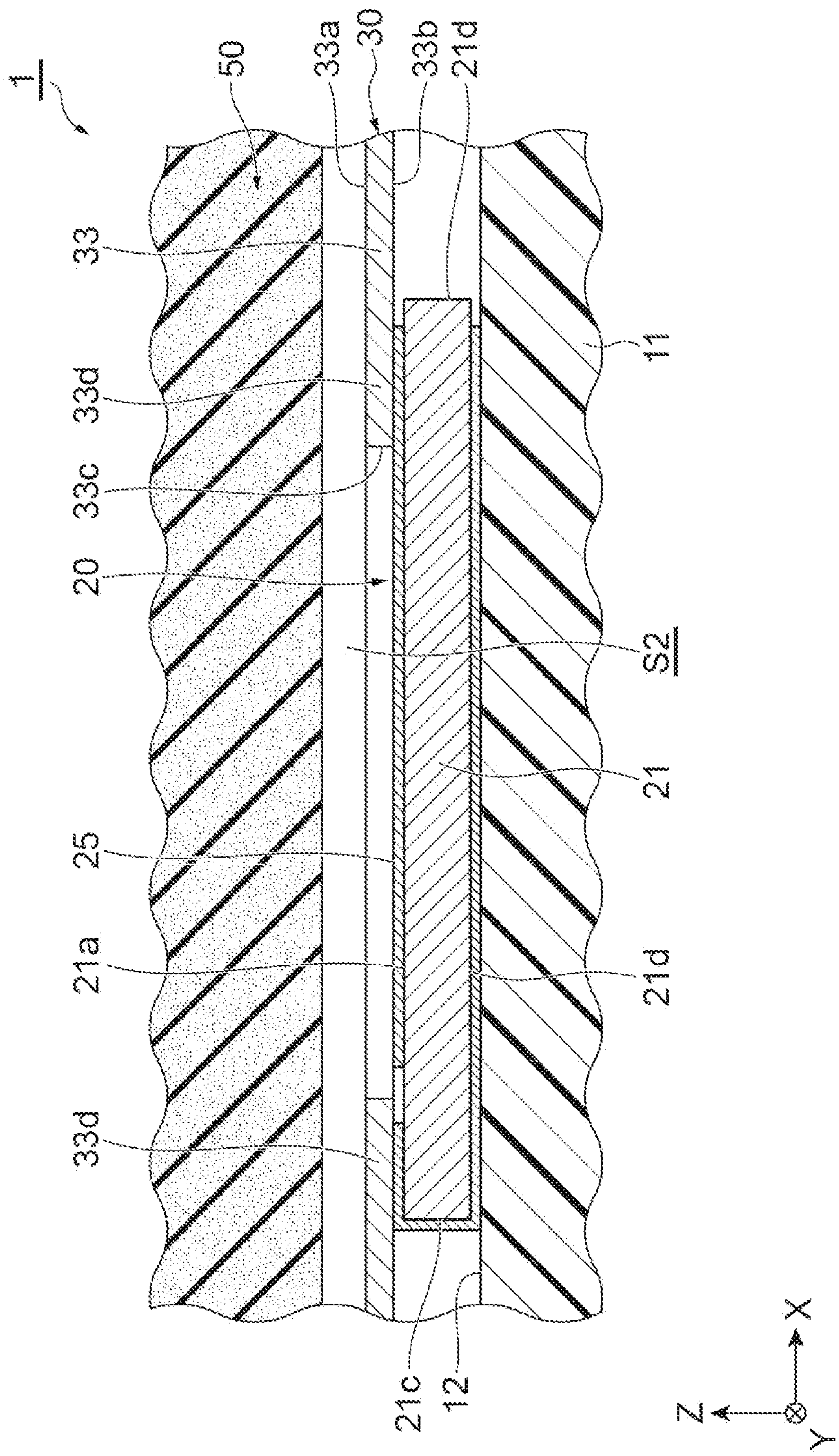
FIG. 5 is a partially enlarged view of FIG. 3.

As shown in FIGS. 4 and 5, the piezoelectric vibrator 20 includes a piezoelectric element body 21 and a pair of electrodes 23,25 for applying a voltage to the piezoelectric element body 21. The piezoelectric vibrator 20 is disposed on the bottom wall 11. The piezoelectric vibrator 20 is fixed on the bottom wall 11 by, for example, adhesion.

The piezoelectric element body 21 has a cuboid shape and a square shape in plan view. The "cuboid shape" in this specification includes a cuboid shape in which corner portions and ridge portions are chamfered and a cuboid shape in which corner portions and ridge portions are rounded. The piezoelectric element body 21 has a pair of square main surfaces 21*a* and 21*b* facing each other and a pair of side surfaces 21*c* and 21*d* facing each other. The side surfaces 21*c* and 21*d* extend in a direction (Z direction) in which the pair of main surfaces 21*a* and 21*b* face each other so as to connect the pair of main surfaces 21*a* and 21*b*. The main surface 21*b* faces the bottom surface 12. The piezoelectric vibrator 20 is disposed on the bottom wall 11 so that the main surface 21*b* and the bottom surface 12 face each other. The direction in which the pair of main surfaces 21*a* and 21*b* face each other is a direction intersecting the bottom wall 11 (the bottom surface 12). The direction in which the pair of main surfaces 21*a* and 21*b* face each other may be a direction orthogonal to the bottom wall 11 (the bottom surface 12).

The piezoelectric element body 21 is made of a piezoelectric ceramic material. The piezoelectric ceramic material may be, for example, PZT [Pb (Zr, Ti) $O_3$], PT ($PbTiO_3$), PLZT [(Pb, La) (Zr, Ti)$O_3$] or barium titanate ($BaTiO_3$). The piezoelectric element body 21 is formed of, for example, a sintered body of a ceramic green sheet containing the above-described piezoelectric ceramic material. The thickness of the piezoelectric element body 21 is, for example, 150 to 500 μm. In the present embodiment, the thickness of the piezoelectric element body 21 is 200 μm.

As shown in FIG. 4, the piezoelectric vibrator 20 is disposed on the bottom wall 11 (the bottom surface 12) such that the side surfaces 21*c* and 21*d* of the piezoelectric element body 21 extend along the Y direction. The piezoelectric vibrator 20 is disposed, for example, substantially at the center of the bottom surface 12 in the X direction and the Y direction.

The one electrode 23 covers substantially the entire area of the main surface 21*b* and continuously covers the side surface 21*c* and a part of the main surface 21*a* on the side of the side surface 21*c*. A portion of the electrode 23 covering the main surface 21*b* is joined to the bottom wall 11 (the bottom surface 12). The other electrode 25 covers substantially the entire main surface 21*a*. The electrode 25 is separated from the electrode 23 covering the main surface 21*a*, and is insulated from the electrode 23. As described above, the piezoelectric element body 21 has a region sandwiched between the pair of electrodes 23 and 25 in the Z direction, and this region constitutes a piezoelectrically active region.

The electrodes 23 and 25 are in direct contact with each of the surfaces 21*a* to 21*c* of the piezoelectric body 21. The thickness of each electrode 23 and 25 is 1.5 μm or less. Each of the electrodes 23 and 25 includes, for example, a stack formed of a chromium (Cr) layer, a nickel-copper alloy (Ni—Cu) layer, and a gold (Au) layer. Each of the electrodes 23 and 25 may include silver (Ag), titanium (Ti), platinum (Pt), a silver-palladium alloy (Ag—Pd), or a nickel-chromium alloy (Ni—Cr). The electrodes 23 are 25 and are formed on the surface of the piezoelectric element body 21 by, for example, a sputtering method.

The wiring member 30 is disposed so as to overlap the piezoelectric vibrator 20 in the housing space S1. The wiring member 30 has a sheet shape and has substantially the same shape as the bottom surface 12 in plan view. More specifically, the wiring member 30 is designed to be slightly smaller than the bottom surface 12 in plan view, and is disposed away from the inner side surface 14 of the case 10. The wiring member 30 is, for example, a flexible printed circuit substrate (FPC substrate) or a flexible flat cable (FFC). That is, the wiring member 30 includes a plurality of wires. The wiring member 30 electrically connects the first pins 41 and 43 and the piezoelectric vibrator 20 by a plurality of wires. In the present embodiment, the wiring member 30 has a configuration in which the pair of wirings 31 and 32 are provided in a resin sheet made of resin such as polyimide resin.

Figure 6:
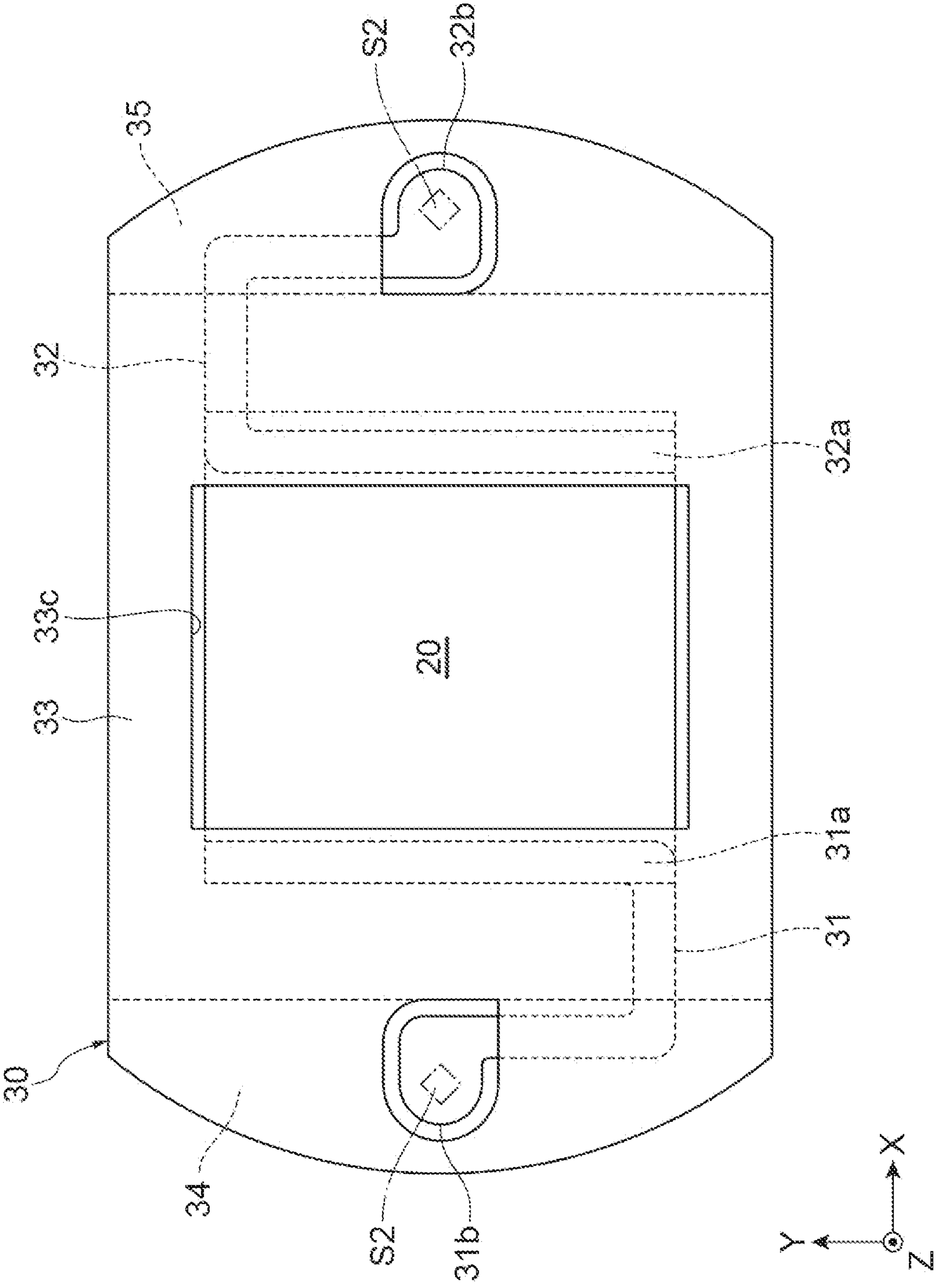
FIG. 6 is a plan view showing the wiring member.
Figure 7:
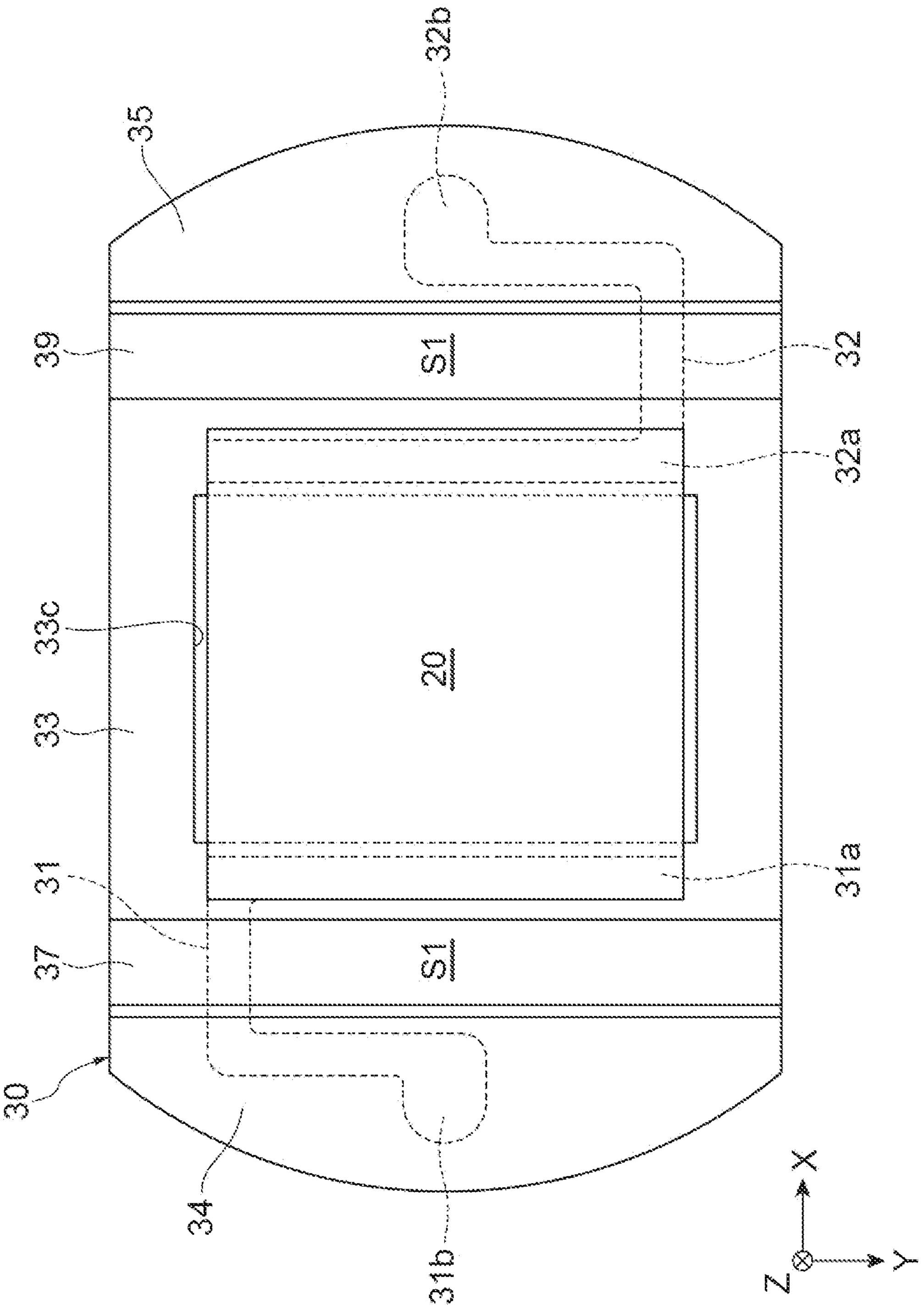
FIG. 7 is a bottom view showing the wiring member.

As shown in FIGS. 5 to 7, the wiring member 30 includes a base portion 33 and a pair of contact portions 34 and 35.

The base portion 33 is a flat plate portion located at the center of the wiring member 30, and has a pair of main surfaces 33*a* and 33*b* facing each other in the Z direction. The wiring member 30 is disposed in the housing space S1 such that the main surface 33*b* of the base portion 33 faces the piezoelectric element body 21.

A opening 33*c* with a rectangular shape is provided in a central region of the base portion 33, and the piezoelectric vibrator 20 is partially exposed from the opening 33*c*. The opening 33*c* may be provided so that the wiring member 30 does not encumber the vibration of the piezoelectric vibrator 20. The wiring member 30 overlaps the electrodes 23 and 25 of the piezoelectric vibrator 20 at an edge 33*d* of the opening 33*c* extending along the Y direction.

The contact portions 34 and 35 extend continuously from the base portion 33 and are provided at positions sandwiching the base portion 33 in the X direction. Each of the contact portions 34 and 35 has an elongated flat plate shape extending in the Y direction, and is designed to be thicker toward the main surface 33*b* side than the thickness of the base portion 33. One contact portion 34 is located on the side surface 21*c* side of the piezoelectric element body 21, and the other contact portion 35 is located on the side surface 21*d* side of the piezoelectric element body 21. The piezoelectric vibrator 20 is not interposed between the contact portions 34 and 35 and the bottom wall 11, and the contact portions 34 and 35 are in direct contact with the bottom surface 12.

The pair of wires 31 and 32 are disposed to extend from the edge 33*d* of the opening 33*c* of the base portion 33 overlapping the piezoelectric vibrator 20 to the contact portions 34 and 35. The pair of wires 31 and 32 have first end portions 31*a* and 32*a* and second end portions 31*b* and 32*b*. The first end portion 31*a* of the wire 31 is provided over the entire width of the edge 33*d* of the opening 33*c* of the base portion 33 overlapping the electrode 23 of the piezoelectric vibrator 20, and is exposed from the resin sheet at the lower surface (the main surface 33*b*) of the edge 33*d* to be electrically connected to the electrode 23 of the piezoelectric vibrator 20. The second end portion 31*b* of the wire 31 is located in the contact portion 34, is exposed from the resin sheet on the second of the contact portion 34, and is electrically connected to the first pin 41 described later. The first end portion 32*a* of the wire 32 is provided over the entire width of the edge 33*d* of the opening 33*c* of the base portion 33 overlapping the electrode 25 of the piezoelectric vibrator 20, is exposed from the resin sheet at the lower surface (the main surface 33*b*) of the edge 33*d*, and is electrically connected to the electrode 25 of the piezoelectric vibrator 20. The second end portion 32*b* of the wire 32 is located in the contact portion 35, is exposed from the resin sheet on the second of the contact portion 35, and is electrically connected to the first pin 43 described later.

The wiring member 30 is further provided with a pair of damper portions 37 and 39 adjacent to the piezoelectric vibrator 20. The damper portions 37 and 39 are provided on the main surface 33*b* of the base portion 33 of the wiring member 30 and interposed between the wiring member 30 and the bottom wall 11. The damper portions 37 and 39 are provided on the main surface 33*b* between the piezoelectric vibrator 20 and the contact portions 34 and 35, respectively. One damper portion 37 is provided between the piezoelectric vibrator 20 and the contact portion 34, and the other damper portion 39 is provided between the piezoelectric vibrator 20 and the contact portion 35. In other words, when viewed from the Z direction, the contact portions 34 and 35 of the wiring member 30 are located outside the damper portions 37 and 39. Each of the damper portions 37 and 39 is made of an insulating material, for example, an insulating resin. In the present embodiment, each of the damper portions 37 and 39 is formed of a thermo-compression resin film (for example, a nitrile rubber-based resin film), and in this case, each of the damper portions 37 and 39 is formed by compression in a state in which a surface layer portion is heated and melted. In the present embodiment, the damper portions 37 and 39 are bonded to both the main surface 30*b* of the wiring member 30 and the bottom surface 12 of the bottom wall 11, thereby fixing the wiring member 30 to the bottom wall 11.

Figure 8:
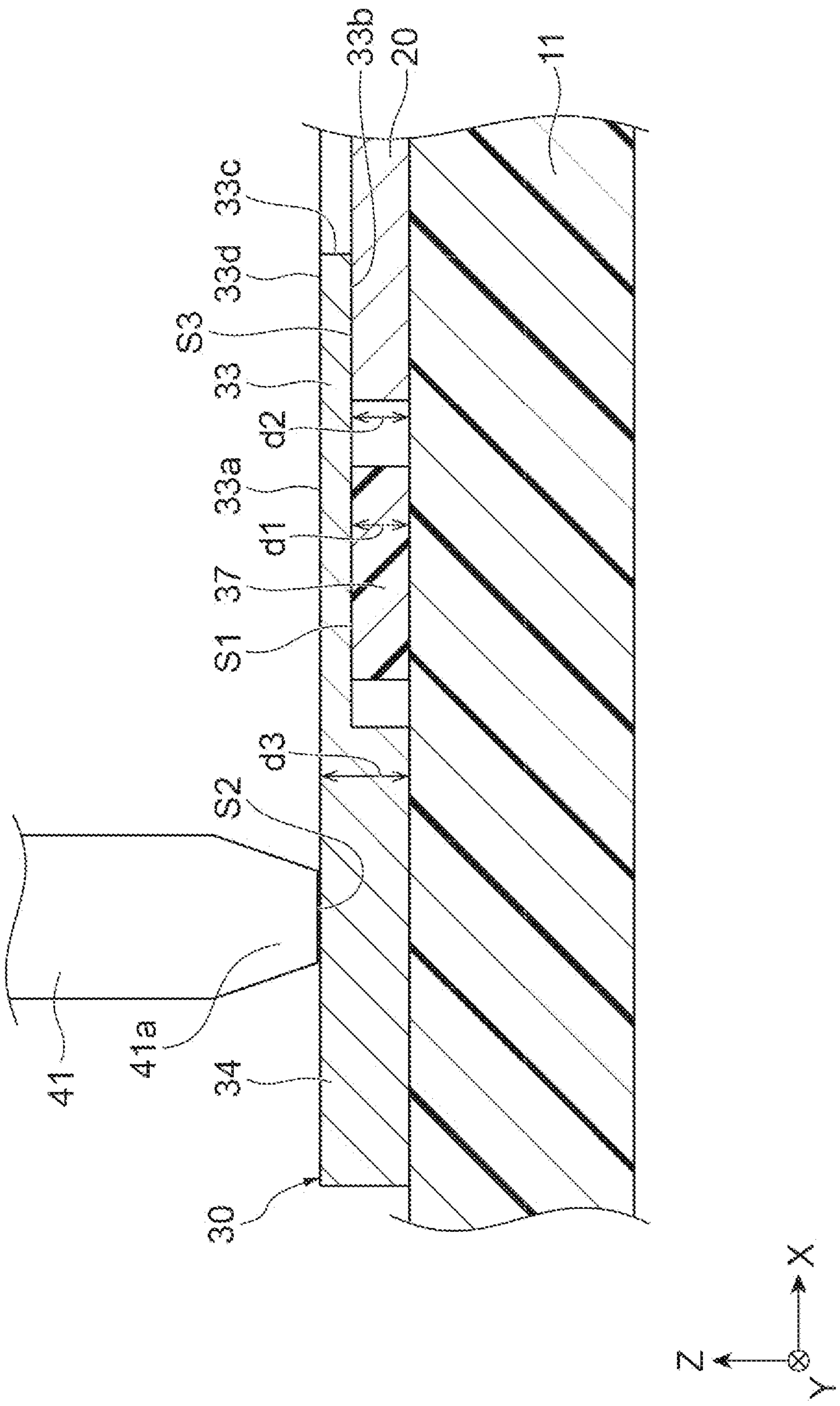
FIG. 8 is an enlarged cross-sectional view of a main part of the cross-sectional view shown in FIG. 3.

As shown in FIG. 7, each of the damper portions 37 and 39 has an elongated flat plate shape and extends over the entire width of the wiring member 30 along the Y direction. Each of the damper portions 37 and 39 extends across between the contact portions 34 and 35 of the wiring member 30 and the piezoelectric vibrator 20 when viewed from the Z direction. As shown in FIG. 8, the upper portions of the damper portions 37 and 39 are in contact with the base portion 33 and the lower portions of the damper portions 37 and 39 are in contact with the bottom wall 11. That is, the thickness d1 of each of the damper portions 37 and 39 is equal to the separation distance d2 between the base portion 33 and the bottom wall 11. In the present embodiment, the hot melt resin forming the damper portions 37 and 39 is heated and melted, the wiring member 30 is attached to the bottom wall 11 via the damper portions 37 and 39, and then the hot melt resin is cooled and solidified. Therefore, the thickness of the hot melt resin before being heated and melted can be designed or selected so that the thickness when cooled and solidified is the same as the separation distance d2 between the base portion 33 and the bottom wall 11. The area S1 of the formation region of each of the damper portions 37 and 39 in the wiring member 30 is designed to be larger than the contact area S2 between the contact portions 34 and 35 of the wiring member 30 and the first pins 41 and 43, and larger than the contact area S3 between the wiring member 30 and the piezoelectric vibrator 20.

The pair of first pins 41,43 (the external wiring) are conductive members having a substantially quadrangular prism shape and extend along the Z direction. The first pins 41 and 43 are aligned so as to be connected to each of the second end portions 31*b* and 32*b* of the wires 31 and 32 of the wiring member 30. The first pins 41 and 43 are connected to the end portions 31*b* and 32*b* by solder or a conductive adhesive. The first pins 41 and 43 are made of, for example, metal. The first pins 41 and 43 are made of, for example, brass. A plating layer (not shown) may be formed on the surface of each of the first pins 41 and 43. The plating layer may be formed by, for example, nickel plating and tin plating. In this case, the plating layer has a two-layer structure.

Portions on the wiring member 30 side of the pair of first pins 41 and 43 are held by the sleeves 45 and 47, respectively. Each of the sleeve 45 and 47 is a cylindrical member having a flange at the both ends. In the present embodiment, the sleeves 45 and 47 have the same shape. Each of the sleeves 45 and 47 is made of resin. Each of the sleeves 45 and 47 is made of a metal such as, for example, phosphorus deoxidized copper (PDC) or brass. When the sleeves 45 and 47 are made of a metal, not only the first pins 41 and 43 but also the sleeve 45 and 47 can be joined to the conductor layer of the wiring member 30, so that the connection reliability is increased. Each of the sleeves 45 and 47 may be made of PEEK (polyetheretherketone) resin, polybutylene terephthalate resin (PBT resin), or polyphenylene sulfide (PPS) resin.

The flange on one end side of each of the sleeves 45 and 47 is joined to the wiring member 30. The sleeves 45 and 47 are disposed at positions overlapping the contact portions 34 and 35 when viewed from the axial direction (Z direction). The axial length of each of the sleeves 45 and 47 is shorter than the axial length of each of the first pins 41 and 43.

The sound absorbing material 50 is disposed on the piezoelectric vibrator 20. The sound absorbing material 50 is disposed between the pair of first pins 41 and 43. The sound absorbing material 50 is disposed in the housing space S1. The sound absorbing material 50 has, for example, a rectangular parallelepiped shape. As shown in FIG. 4, the sound absorbing material 50 overlaps the entire piezoelectric vibrator 20 when viewed from the thickness direction (Z direction) of the piezoelectric vibrator 20. That is, the piezoelectric vibrator 20 is located inside the outer edge 51 of the sound absorbing material 50 when viewed from the Z direction. This further reduces reverberation of the ultrasonic component. The piezoelectric vibrator 20 is positioned substantially at the center of the sound absorbing material 50 in the X direction and the Y direction when viewed from the Z direction. The sound absorbing material 50 is made of, for example, a foam (a cellular structure) mainly containing a thermoplastic resin. The thermoplastic resin includes, for example, ethylene-propylene-diene rubber (EPDM).

The substrate 60 is disposed in parallel to the piezoelectric vibrator 20 with the sound absorbing material 50 interposed therebetween. The substrate 60 is disposed in the housing space S1. The substrate 60 is a plate-shaped member. The substrate 60 has a pair of main surfaces 60*a* and 60*b* facing each other in the Z direction. The main surface 60*b* faces the sound absorbing material 50.

Each of the main surfaces 60*a* and 60*b* has an ellipse shape. The long diameter direction of each of the main surfaces 60*a* and 60*b* is along the Y direction. The short diameter direction of each of the main surfaces 60*a* and 60*b* is along the X direction. The pair of the edges in the short diameter direction of each of the main surfaces 60*a* and 60*b* are curved so as to expand outward and has an arc shape. The substrate 60 is provided with insertion holes 61 and 63 through which the first pins 41 and 43 are inserted. The insertion holes 61 and 63 are formed at both end portions of the substrate 60 in the X direction and have a circular shape. The pair of the edges in the short diameter direction of each of the main surfaces 60*a* and 60*b* is curved along the insertion holes 61 and 63.

The substrate 60 is electrically connected to the pair of first pins 41 and 43. The substrate 60 is made of, for example, glass epoxy substrate. A plurality of conductor layers are disposed in the substrate 60. The plurality of conductor layers are adhered to the substrate 60. In the present embodiment, as shown in FIG. 2, a pair of conductor layers 66 and 68 are disposed in the substrate 60. One conductor layer 66 connects the first pin 41 and the second pin 65, and the other conductor layer 68 connects the first pin 43 and the second pin 67.

The first pin 41 and the second pin 65 are connected to one conductor layer 66 of the substrate 60 by solder or a conductive adhesive, and are electrically connected to each other through the conductor layer 66. The first pin 43 and the second pin 67 are connected to the other conductor layer 68 of the substrate 60 by solder or a conductive adhesive, and are electrically connected to each other through the conductor layer 68.

The second pins 65 and 67 are disposed on the main surface 60*a* in a state of being separated from each other in the X direction. The second pins 65 and 67 extend from the main surface 60*a* in the Z direction and penetrates the vibration isolator 70. The second pins 65 and 67 are disposed between the first pins 41 and 43 in the X direction. In the present embodiment, the second pins 65 and 67 have the same shape. The second pins 65 and 67 are made of, for example, metal. For example, the second pins 65 and 67 are made of brass. A plating layer (not shown) may be formed on the surface of each of the second pins 65 and 67. The plating layer may be formed by, for example, nickel plating and tin plating. In this case, the plating layer has a two-layer structure.

The vibration isolator 70 is disposed in contact with the inner surface (the inner side surface 14) of the case 10 to prevent vibration of the case 10. The vibration isolator 70 is disposed around the sound absorbing material 50. The vibration isolator 70 includes a lid body 71 and a frame 73. The lid body 71 seals the opening of the case 10 in a state where the piezoelectric vibrator 20, the wiring member 30, the first pins 41 and 43, the sleeves 45 and 47, the sound absorbing material 50, and the substrate 60 are disposed in the case 10. The lid body 71 seals the housing space S1. The leading ends of the second pins 65 and 67 protrude from the lid body 71.

A recessed portion 71*c* in which the first pin 41 is disposed and a recessed portion 71*d* in which the first pin 43 is disposed are provided on the bottom surface of the recessed portion 71*b*. The recessed portions 71*c* and 71*d* have, for example, a circular cross section. The diameters of the recessed portions 71*c* and 71*d* are larger than the diameter of the first pins 41 and 43. The inner surfaces of the recessed portions 71*c* and 71*d* are separated from the first pins 41 and 43. The recessed portions 71*c* and 71*d* are provided at both the end portions of the bottom surface of the recessed portion 71*b* in the X direction.

The frame body 73 extends in a direction intersecting the lid body 71. The direction intersecting the lid body 71 may be, for example, a direction orthogonal to the lid body 71. The lid 71 body and the frame body 73 are formed integrally. The vibration isolator 70 is a tubular member having one axial end closed and the other axial end open. The vibration isolator 70 is fitted into the case 10. The vibration isolator 70 is press-fitted into the case 10. The frame body 73 extends from the lid body 71 to the inside of the case 10 along the Z direction. The frame body 73 is separated from the bottom surface 12. The frame body 73 is in contact with the inner side surface 14 of the case 10.

The frame body 73 surrounds the sound absorbing material 50. The sound absorbing material 50 protrudes to the piezoelectric vibrator 20 side more than the vibration isolator 70 (frame body 73) in the thickness direction (Z direction) of the piezoelectric vibrator 20. The distance between the frame body 73 and the piezoelectric vibrator 20 in the Z direction is longer than the distance between the sound absorbing material 50 and the piezoelectric vibrator 20 in the Z direction.

The frame body 73 has a pair of side portions 75 and a pair of side portions 77. The pair of side portions 75 face each other in the X direction with the sound absorbing material 50 interposed therebetween. The pair of side portions 77 face each other in the Y direction with the sound absorbing material 50 interposed therebetween. The side portions 75 face the side surfaces 50*c* of the sound absorbing material 50. Each of the side portions 75 is spaced from the sound absorbing material 50.

The pair of side portions 77 sandwich and hold the sound absorbing material 50. The sound absorbing material 50 is fitted between the pair of side portions 77. The pair of side portions 77 compress the sound absorbing material 50. The sound absorbing material 50 presses the pair of side portions 77 by a repulsive force against the compression. Each of the side portions 77 is in contact with each of the side surfaces 50*d* of the sound absorbing material 50.

The vibration isolator 70 further includes a plurality of protruding portions 79 protruding from the lid body 71 toward the inner side surface 14. The protruding portion 79 is provided in the lid body 71 at a position corresponding to the step portion 15 of the case 10. The protruding portion 79 is disposed in the corresponding step portion 15. The vibration isolator 70 is positioned with respect to the case 10 by the protruding portion 79 being locked to the step portion 15.

The vibration isolator 70 is an elastic body and prevents reverberation by elasticity. The vibration isolator 70 is made of resin. The vibration isolator 70 is a non-foamed body and has a density higher than that of the sound absorbing material 50. The vibration isolator 70 is made of, for example, silicone rubber. The vibration isolator 70 is made of, for example, RTV (Room Temperature Vulcanizing) silicone rubber.

The ultrasonic transducer 1 described above transmits an output wave and receives the output wave reflected from the inspection target. When the ultrasonic sensor is close to the inspection target and the distance from the ultrasonic transducer 1 to the inspection target is small, the voltage of the reverberation component generated in transmitting the output wave interferes with the reception voltage of the output wave reflected from the inspection target. This may make it difficult for the ultrasonic transducer 1 to detect the reception voltage.

The ultrasonic transducer 1 includes the case 10, the piezoelectric vibrator 20 disposed in the case 10, the wiring member 30 overlapped with the piezoelectric vibrator 20 in the case 10 and inputting a signal for vibrating the piezoelectric vibrator 20 received from the outside to the piezoelectric vibrator 20, and the damper portions 37 and 39 provided in the wiring member 30 and adjacent to the piezoelectric vibrator 20 when viewed from the thickness direction (Z direction) of the piezoelectric vibrator 20. In the ultrasonic transducer 1, the damper portions 37 and 39 provided adjacent to the piezoelectric vibrator 20 prevent vibration transmitted through the wiring member 30 due to vibration of the piezoelectric vibrator 20. The damper portions 37 and 39 can prevent longitudinal vibration (vibration in the Z direction) and lateral vibration (vibration in the X direction). The prevention of vibration by the damper portions 37 and 39 allows the ultrasonic transducer 1 to reduce reverberation of the ultrasonic component.

The damper portions 37 and 39 are separated from the piezoelectric vibrator 20 by a predetermined distance so as not to be in contact with the piezoelectric vibrator 20, thereby preventing the damper portions 37 and 39 from encumbering the vibration of the piezoelectric vibrator 20. In addition, the damper portions 37 and 39 can be separated from the contact portions 34 and 35 by a predetermined distance so as not to come into contact with the contact portions 34 and 35 of the wiring member 30. In this case, the vibration of the piezoelectric vibrator 20 is prevented from directly propagating from the damper portions 37 and 39 to the contact portions 34 and 35, and the reverberation of the ultrasonic wave component is further reduced.

The thickness d1 of each of the damper portions 37 and 39 may be equal to the separation distance d2 between the base portion 33 and the bottom wall 11 or may be smaller than the separation distance d2. When the thickness d1 is smaller than the separation distance d2, the damper portions 37 and 39 and the base portion 33 of the wiring member 30 are bent in the Z direction.

Although the embodiments of the present disclosure have been described above, the present disclosure is not necessarily limited to the above-described embodiments, and various modifications can be made without departing from the gist thereof.

For example, the ultrasonic transducer 1 may transmit only ultrasonic waves. The piezoelectric vibrator 20 may include one or more internal electrodes disposed in the piezoelectric element body 21. In this case, the piezoelectric element body 21 may have a plurality of piezoelectric layers, and the internal electrodes and the piezoelectric layers may be alternately arranged.

Furthermore, the piezoelectric element body 21 may have a rectangular shape or a circular shape instead of a square shape when viewed from the Z direction. In addition, the opening 30*c* of the wiring member 30 is not limited to a quadrangular shape, and may be a U-shape.

What is claimed is:

1. An ultrasonic transducer comprising:
- a case;
- a piezoelectric vibrator with a plate shape disposed in the case;
- a wiring member overlapped with the piezoelectric vibrator in the case and configured to input a signal for vibrating the piezoelectric vibrator received from the outside to the piezoelectric vibrator;
- a damper portion provided in the wiring member and adjacent to the piezoelectric vibrator when viewed from a thickness direction of the piezoelectric vibrator.

2. The ultrasonic transducer according to claim 1, further comprising an external wiring for inputting a signal for vibrating the piezoelectric vibrator to the wiring member.

3. The ultrasonic transducer according to claim 2, wherein the external wiring extends in a direction along a thickness direction of the piezoelectric vibrator.

4. The ultrasonic transducer according to claim 3, wherein the wiring member has a contact portion that is in contact with the external wiring on an outer side of the damper portion when viewed from the thickness direction of the piezoelectric vibrator.

5. The ultrasonic transducer according to claim 4, wherein the damper portion is positioned between the contact portion and the piezoelectric vibrator when viewed from the thickness direction of the piezoelectric vibrator.

6. The ultrasonic transducer according to claim 5, wherein the damper portion extends across between the contact portion and the piezoelectric vibrator when viewed from the thickness direction of the piezoelectric vibrator.

7. The ultrasonic transducer according to claim 4, wherein the damper portion is thinner than the contact portion of the wiring member.

8. The ultrasonic transducer according to claim 4, wherein an area of a formation region of the damper portion in the wiring member is larger than a contact area between the wiring member and the external wiring and is larger than a contact area between the wiring member and the piezoelectric vibrator.

9. The ultrasonic transducer according to claim 1, wherein the damper portion is bent in a thickness direction of the piezoelectric vibrator.

10. The ultrasonic transducer according to claim 1, wherein an opening is provided in the wiring member, and an edge portion of the opening is in contact with the piezoelectric vibrator.

* * * * *